(12) United States Patent
Suzuki et al.

(10) Patent No.: US 11,833,862 B2
(45) Date of Patent: Dec. 5, 2023

(54) TIRE PRESSURE MONITORING SYSTEM INCLUDING TIRE SIDE AND VEHICLE SIDE DEVICES

(71) Applicant: DENSO CORPORATION, Kariya (JP)

(72) Inventors: Yoichiro Suzuki, Nisshin (JP); Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 169 days.

(21) Appl. No.: 17/381,574

(22) Filed: Jul. 21, 2021

(65) Prior Publication Data

US 2021/0347214 A1 Nov. 11, 2021

Related U.S. Application Data

(63) Continuation of application No. PCT/JP2020/006277, filed on Feb. 18, 2020.

(30) Foreign Application Priority Data

Feb. 19, 2019 (JP) .................................. 2019-027697

(51) Int. Cl.
*B60C 23/00* (2006.01)
*B60C 23/04* (2006.01)
(Continued)

(52) U.S. Cl.
CPC ........ *B60C 23/002* (2013.01); *B60C 23/0486* (2013.01); *G01B 17/00* (2013.01); *G01L 5/00* (2013.01); *G01M 17/025* (2013.01)

(58) Field of Classification Search
CPC .. G01M 17/02; G01M 17/022; G01M 17/027; G01M 17/021; G01M 17/024;
(Continued)

(56) References Cited

U.S. PATENT DOCUMENTS 7,000,462 B2 * 2/2006 Hillenmayer ....... B60C 23/0488
73/146.5
2004/0046648 A1 3/2004 Matsuura
(Continued)

FOREIGN PATENT DOCUMENTS

DE 102015223970 A1 6/2017
JP 2006084424 A 3/2006
(Continued)

*Primary Examiner* — Andre J Allen
(74) *Attorney, Agent, or Firm* — Harness, Dickey & Pierce, P.L.C.

(57) ABSTRACT

A tire side device includes a vibration detection unit that outputs a detection signal according to a magnitude of vibration of a tire, an air pressure detection unit that detects the tire pressure, a data acquisition unit that calculates a contact length of the tire with a road surface based on the detection signal and acquires a wheel load data that is a data related to the wheel load based on the contact length, and a data transmission unit that transmits a data related to the tire pressure and the wheel load data. A vehicle side device includes a receiving unit that receives data on tire pressure and wheel load data, a threshold setting unit that sets an alarm threshold for tire pressure based on the wheel load data, and an alarm determination unit that determines that the tire pressure has decreased when the tire pressure indicated by the data on the tire pressure decreases below the alarm threshold.

7 Claims, 7 Drawing Sheets

(51) Int. Cl.
*G01M 17/02* (2006.01)
*G01L 17/00* (2006.01)
*G01B 17/00* (2006.01)
*G01L 5/00* (2006.01)

(58) Field of Classification Search
CPC ............. G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06; B60C 23/048; B60C 23/0496; B60C 23/061; B60C 23/0494; B60C 23/0416; B60C 23/0433; B60C 23/0493; B60C 19/00; B60C 23/04; B60C 23/041; B60C 23/0462; B60C 23/0411; B60C 23/20; B60C 23/0444; B60C 23/0479; B60C 11/24; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/099; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01B 11/22; G01B 7/28; G01B 5/18; G01B 21/20; G01B 3/28; G01B 11/16; G01B 11/24; G01B 7/26; G01B 7/16; G01B 11/25; G01B 5/30; G01B 7/345; G01B 7/34; G01B 11/306; G01B 5/20; G01B 11/2522; G01B 11/162; G01B 5/255; G01B 5/285; G01B 7/282; G01B 11/161; G01B 21/30; G01B 5/0025 G01B 7/06; G01B 7/14; G01B 11/2518; G01B 11/30; G01B 2210/26; G01B 5/0002; G01B 7/30; G01B 9/021; G01B
11/2441; G01B 11/245; G01B 21/18;
G01B 2210/22; G01B 7/287; G01B
9/025; G01B 1/00; G01B 11/0608; G01B
11/275; G01B 17/00; G01B 21/12; G01B
21/26; G01B 11/026; G01B 11/028;
G01B 11/2755; G01B 11/303; G01B
15/00; G01B 17/02; G01B 21/047; G01B
21/32; G01B 5/06; G01B 5/252; G01B
7/087; G01B 11/00; G01B 11/002; G01B
11/04; G01B 11/06; G01B 11/0691;
G01B 11/08; G01B 11/14; G01B 11/165;
G01B 11/167; G01B 11/2416; G01B
11/2513; G01B 11/255; G01B 11/272;
G01B 11/28; G01B 15/02; G01B 17/04;
G01B 21/04; G01B 21/08; G01B
2210/20; G01B 2210/28; G01B 2210/58;
G01B 3/14; G01B 3/46; G01B 5/0004;
G01B 5/08; G01B 5/14; G01B 5/201;
G01B 5/213; G01B 5/28; G01B 7/00;
G01B 7/048; G01B 7/281; G01B 7/293;
G01B 7/312; G01B 9/02027; G01B
9/02092; G01B 11/105; G01B 11/2504;
G01B 21/042; G01B 21/22; G01B
2210/14; G01B 2210/50; G01B 3/1084;
G01B 3/1092; G01B 3/30; G01B 5/24;
G01B 7/24; G01L 17/00; G01L 17/005;
G01L 5/20; G01L 19/086; G01L 5/161;
G01L 5/1627; G01L 16/12; G01L 9/0075;
G01L 19/083; G01L 7/16; G01L 19/0092;
G01L 19/08; G01L 5/0019; G01L 7/166;
G01L 9/0025; G01L 5/164; G01L 9/0072;
G01L 9/125; G01L 19/0636; G01L 5/162;
G01L 27/007; G01L 19/0007; G01L
5/0004; G01L 5/16; G01L 25/00; G01L
1/146; G01L 1/16; G01L 27/005; G01L
5/282; G01L 7/04; G01L 9/0073; G01L
19/04; G01L 5/28; G01L 9/0089; G01L
9/12; G01L 1/18; G01L 19/0618; G01L
19/10; G01L 19/16; G01L 5/169; G01L
1/122; G01L 1/2206; G01L 13/00; G01L
19/02; G01L 5/167; G01L 1/22; G01L
1/2287; G01L 3/245; G01L 5/0023; G01L
5/102; G01L 9/0008; G01L 9/0055; G01L
9/04; G01L 1/20; G01L 15/00; G01L
19/141; G01L 19/147; G01L 27/02; G01L
3/14; G01L 5/00; G01L 5/0009; G01L
5/045; G01L 5/223; G01L 7/086; G01L
7/163; G01L 9/0041; G01L 9/0047; G01L
1/142; G01L 1/165; G01L 1/2218; G01L
1/2262; G01L 1/2268; G01L 1/2281;
G01L 11/00; G01L 19/0015; G01L
19/0084; G01L 19/0609; G01L 19/0627;
G01L 19/0645; G01L 19/0672; G01L
19/069; G01L 19/148; G01L 27/00; G01L
3/1464; G01L 3/22; G01L 5/108; G01L
5/12; G01L 5/13; G01L 5/133; G01L
5/26; G01L 5/284; G01L 7/022; G01L
7/043; G01L 7/084; G01L 7/088; G01L
7/187; G01L 9/0051; G01L 9/008; G01L
9/06; G01L 9/065; G01L 9/08; G01L
9/14; G01L 19/0038; G01L 19/06; G01L
19/0654; G01L 19/14; G01L 19/142;
G01L 19/145; G01L 2019/0053; G01L
3/108; G01L 5/0085; G01L 5/166; G01L
7/02; G01L 9/0052; G01L 9/0098; G01L
9/10

USPC .................................................. 73/146–146.8
See application file for complete search history.

(56) References Cited

U.S. PATENT DOCUMENTS

2006/0064238 A1    3/2006  Kitano
2011/0190974 A1*   8/2011  Wada .................... B60C 23/061
                                                    701/31.4

FOREIGN PATENT DOCUMENTS

| JP | 2007106324 A |   | 4/2007  |              |
|----|--------------|---|---------|--------------|
| JP | 3980975 B2   |   | 9/2007  |              |
| JP | 2010066261 A | * | 3/2010  | ........... G01G 19/086 |
| JP | 2012218682 A |   | 11/2012 |              |
| JP | 5250754 B2   | * | 7/2013  | ......... B60C 23/0408 |
| JP | 2016022761 A |   | 2/2016  |              |

* cited by examiner

TIRE PRESSURE MONITORING SYSTEM INCLUDING TIRE SIDE AND VEHICLE SIDE DEVICES

CROSS REFERENCE TO RELATED APPLICATION

This application is a continuation application of International Patent Application No. PCT/JP2020/006277 filed on Feb. 18, 2020, which designated the U.S. and based on and claims the benefits of priority of Japanese Patent Application No. 2019-027697 filed on Feb. 19, 2019. The entire disclosure of all of the above applications is incorporated herein by reference.

TECHNICAL FIELD

The present disclosure relates to a tire pressure monitoring system (hereinafter referred to as TPMS) that detects a decrease in tire pressure or the like.

BACKGROUND

A tire pressure monitoring system (TPMS) may be a direct type for directly detecting tire's pneumatic pressure.

SUMMARY

An object of the present disclosure is to provide a TPMS capable of determining a decrease in tire pressure more accurately.

In a TPMS according to one aspect of the present disclosure, a tire side device includes a vibration detection unit that outputs a detection signal according to a magnitude of vibration of a tire, an air pressure detection unit that detects the tire pressure, which is the pressure inside the tire, a data acquisition unit that calculates a contact length of the tire with a road surface based on the detection signal and acquires a wheel load data that is a data related to the wheel load based on the contact length, and a data transmission unit that transmits a data related to the tire pressure and the wheel load data. A vehicle side device includes a receiving unit that receives data on tire pressure and wheel load data, a threshold setting unit that sets an alarm threshold for tire pressure based on the wheel load data, and an alarm determination unit that determines that the tire pressure has decreased when the tire pressure indicated by the data on the tire pressure decreases below the alarm threshold, and an alarm unit that gives an alarm when it is determined that the tire pressure has decreased.

In the TPMS according to another aspect of the present disclosure, a tire side device includes a vibration detection unit that outputs a detection signal according to a magnitude of vibration of a tire, an air pressure detection unit that detects the tire pressure, which is the pressure inside the tire, a data acquisition unit that calculates a contact length of the tire with a road surface based on the detection signal and acquires a wheel load data that is a data related to the wheel load based on the contact length, a threshold setting unit that sets an alarm threshold for tire pressure based on the wheel load data, an alarm determination unit that determines that the tire pressure indicated by tire pressure data decreases below the alarm threshold, and a data transmission unit that transmits data indicating that the tire pressure has decreased. Further, the vehicle side device includes a receiving unit that receives data indicating that the tire pressure has decreased, and an alarm unit that gives an alarm when data indicating that the tire pressure has decreased is received.

DETAILED DESCRIPTION

Figure 1:
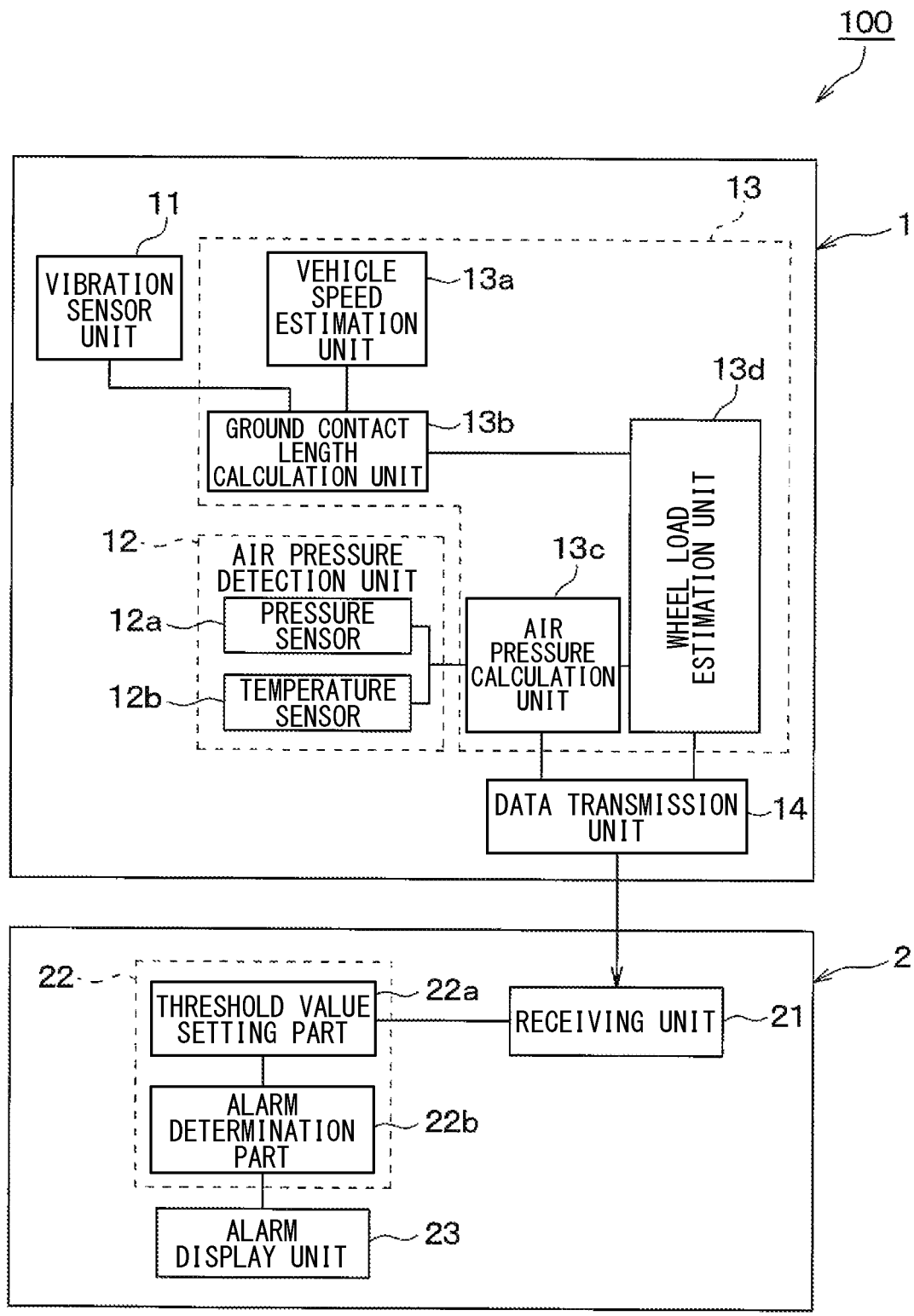
FIG. 1 is a diagram showing an overall block configuration of a TPMS according to a first embodiment.

In an assumable example, a tire pressure monitoring system (TPMS) may be a direct type for directly detecting tire's pneumatic pressure. In this type of TPMS, a transmitter equipped with an air pressure detection unit such as a pressure sensor is directly attached to a wheel side to which a tire is attached. In addition, an antenna and a receiver are provided on a vehicle body side, and when data indicating a detection result of the air pressure detection unit is transmitted from the transmitter, data indicating a detection result is received by the receiver via an antenna. Then, the tire pressure is detected. In such a TPMS, an alarm threshold value is set so as to give an alarm when the tire pressure is reduced by a predetermined ratio, for example, 25% with respect to a recommended pressure when riding alone.

However, the recommended tire pressure differs depending on a type of tire and the like. Therefore, a technique has been proposed in which an alarm threshold value is set according to the type of tire and the alarm threshold value is switched according to the type of tire.

However, the recommended pressure set in the conventional TPMS is a value set when one person is on board, and does not correspond to the increase or decrease in the number of passengers or a presence or absence of cargo loading. Therefore, regardless of the increase or decrease in the number of passengers or the presence or absence of cargo loading, a decrease in tire pressure is determined based on a certain warning threshold value. Therefore, it is not possible to accurately determine the decrease in tire pressure, which may lead to a decrease in safety. An object of the present disclosure is to provide a TPMS capable of determining a decrease in tire pressure more accurately.

In a TPMS according to one aspect of the present disclosure, a tire side device includes a vibration detection unit that outputs a detection signal according to a magnitude of vibration of a tire, an air pressure detection unit that detects the tire pressure, which is the pressure inside the tire, a data acquisition unit that calculates a contact length of the tire with a road surface based on the detection signal and acquires a wheel load data that is a data related to the wheel load based on the contact length, and a data transmission unit that transmits a data related to the tire pressure and the wheel load data. A vehicle side device includes a receiving unit that receives data on tire pressure and wheel load data, a threshold setting unit that sets an alarm threshold for tire pressure based on the wheel load data, and an alarm determination unit that determines that the tire pressure has decreased when the tire pressure indicated by the data on the tire pressure decreases below the alarm threshold, and an alarm unit that gives an alarm when it is determined that the tire pressure has decreased.

In this way, in the tire side device, wheel load data is acquired based on the tire pressure and the contact length, and the wheel load data is transmitted to the vehicle side device. Further, the data is received by the vehicle side device and an alarm threshold value is set based on the wheel load data so that the alarm threshold value corresponding to the wheel load is obtained. This makes it possible to variably set the alarm threshold value for the wheel load, and by comparing the tire pressure with the alarm threshold value corresponding to the wheel load, it is possible to determine the decrease in the tire pressure. Therefore, it is possible to accurately determine the decrease in the tire pressure.

In the TPMS according to another aspect of the present disclosure, a tire side device includes a vibration detection unit that outputs a detection signal according to a magnitude of vibration of a tire, an air pressure detection unit that detects the tire pressure, which is the pressure inside the tire, a data acquisition unit that calculates a contact length of the tire with a road surface based on the detection signal and acquires a wheel load data that is a data related to the wheel load based on the contact length, a threshold setting unit that sets an alarm threshold for tire pressure based on the wheel load data, an alarm determination unit that determines that the tire pressure indicated by tire pressure data decreases below the alarm threshold, and a data transmission unit that transmits data indicating that the tire pressure has decreased. Further, the vehicle side device includes a receiving unit that receives data indicating that the tire pressure has decreased, and an alarm unit that gives an alarm when data indicating that the tire pressure has decreased is received.

In this way, the tire side device may be provided with a function of determining a decrease in tire pressure, such as the threshold value setting unit and the alarm determination unit. As a result, it is possible to obtain the same effect as the TPMS in one aspect of the present disclosure described above.

A reference numeral in parentheses attached to each component or the like indicates an example of correspondence between the component or the like and specific component or the like described in an embodiments below.

Hereinafter, embodiments of the present disclosure will be described with reference to the drawings. In the following embodiments, the same or equivalent parts are denoted by the same reference numerals.

First Embodiment

A TPMS according to the present embodiment will be described. The TPMS according to the present embodiment sets a tire pressure warning threshold based on a tire contact patch provided on each wheel of a vehicle, that is, a wheel load indicated by a length of a tire contact patch in a tire traveling direction, and detects a decrease in tire pressure.

As shown in FIG. 1, the TPMS 100 has a tire side device 1 provided on a tire side and a vehicle side device 2 provided on a vehicle body side on which the tire is mounted. The TPMS 100 transmits data on a tire pressure of the wheels provided in the tire side device 1 from the tire side device 1, the vehicle side device 2 receives data transmitted from the tire side device 1 by the vehicle side device 2, and determines the tire pressure based on the data. Specifically, the tire side device 1 and the vehicle side device 2 are configured as follows.

Figure 2:
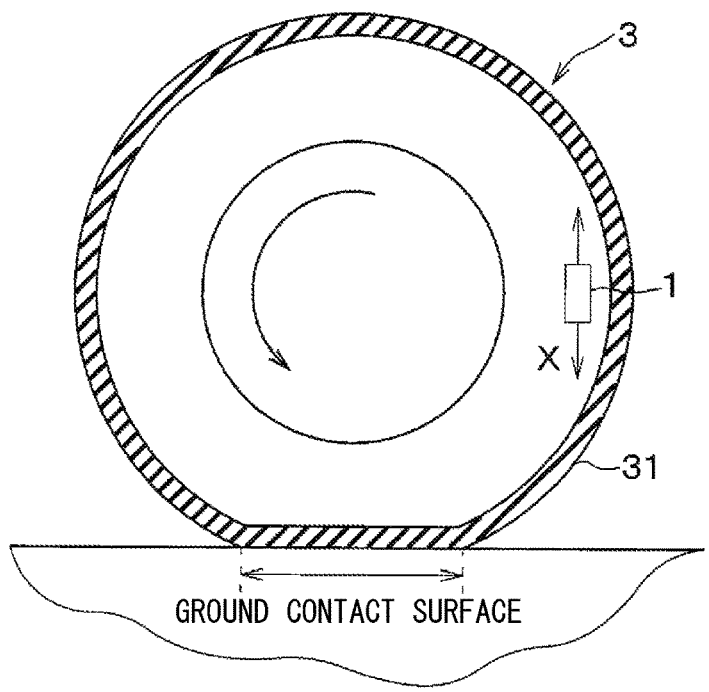
FIG. 2 is a diagram schematically showing a cross-sectional view of a tire attached to a tire side device.

As shown in FIG. 1, the tire side device 1 is configured to include a vibration sensor unit 11, an air pressure detection unit 12, a signal processing unit 13, and a data transmission unit 14. For example, as shown in FIG. 2, the tire side device 1 is provided on a back surface side of a tread 31 of a tire 3.

The vibration sensor unit 11 constitutes a sensing unit, and constitutes a vibration detection unit for detecting a vibration applied to the tire 3. For example, the vibration sensor unit 11 is configured by an acceleration sensor. In case that the vibration sensor unit 11 is the acceleration sensor, the vibration sensor unit 10 outputs a detection signal of acceleration as a detection signal, which corresponds to the vibration in a direction tangential to a circular trajectory drawn up by the tire-side device 1 at the time of rotation of the tire 3, that is, a tire tangential direction indicated by an arrow X in FIG. 2. More specifically, the vibration sensor unit 11 generates as the detection signal an output voltage, which is positive in one direction and negative in the opposite direction, between two directions indicated with the arrow X. For example, the vibration sensor unit 11 performs acceleration detection at a predetermined sampling cycle set at a cycle shorter than one rotation of the tire 3, and outputs a detection result as the detection signal to the signal processing unit 13. Although the detection signal of the vibration sensor unit 11 may be represented as an output voltage or an output current, the detection signal is exemplified to be the output voltage in the present embodiment as an example.

An air pressure detection unit 12 is for detecting the tire pressure, which is the pressure inside the tire 3, and is configured to include a pressure sensor 12a and a temperature sensor 12b. The pressure sensor 12a outputs a detection signal indicating a tire pressure. The temperature sensor 12b outputs a detection signal indicating a tire internal temperature. The data of the tire pressure and the tire temperature indicated by the detection signals of the pressure sensor 12a and the temperature sensor 12b are used as data relating to the tire pressure. The signal processing unit 13 is composed of a computer equipped with a CPU, ROM, RAM, I/O, etc., and functions as a control unit that performs various processing according to a program stored in a memory such as ROM. For example, the signal processing unit 13 estimates the vehicle speed from the detection signal of the vibration sensor unit 11, obtains a contact length of the tire 3, and estimates the wheel load from the result and the tire pressure detected by the pressure sensor 12a. Further, the signal processing unit 13 also performs a process of transmitting data on the tire pressure and data on the wheel load to the data transmission unit 14.

Specifically, the signal processing unit 13 is configured to include a vehicle speed estimation unit 13a, a ground contact length calculation unit 13b, an air pressure calculation unit 13c, and a wheel load estimation unit 13d.

The vehicle speed estimation unit 13a estimates a vehicle speed by using the detection signal of the vibration sensor unit 11 as a detection signal representing vibration data in a tire tangential direction and performing waveform processing of the vibration waveform indicated by the detection signal. Similarly, the ground contact length calculation unit 13b calculates a ground contact length of the tire 3 by performing waveform processing of the vibration waveform indicated by the detection signal of the vibration sensor unit 11.

Figure 3:
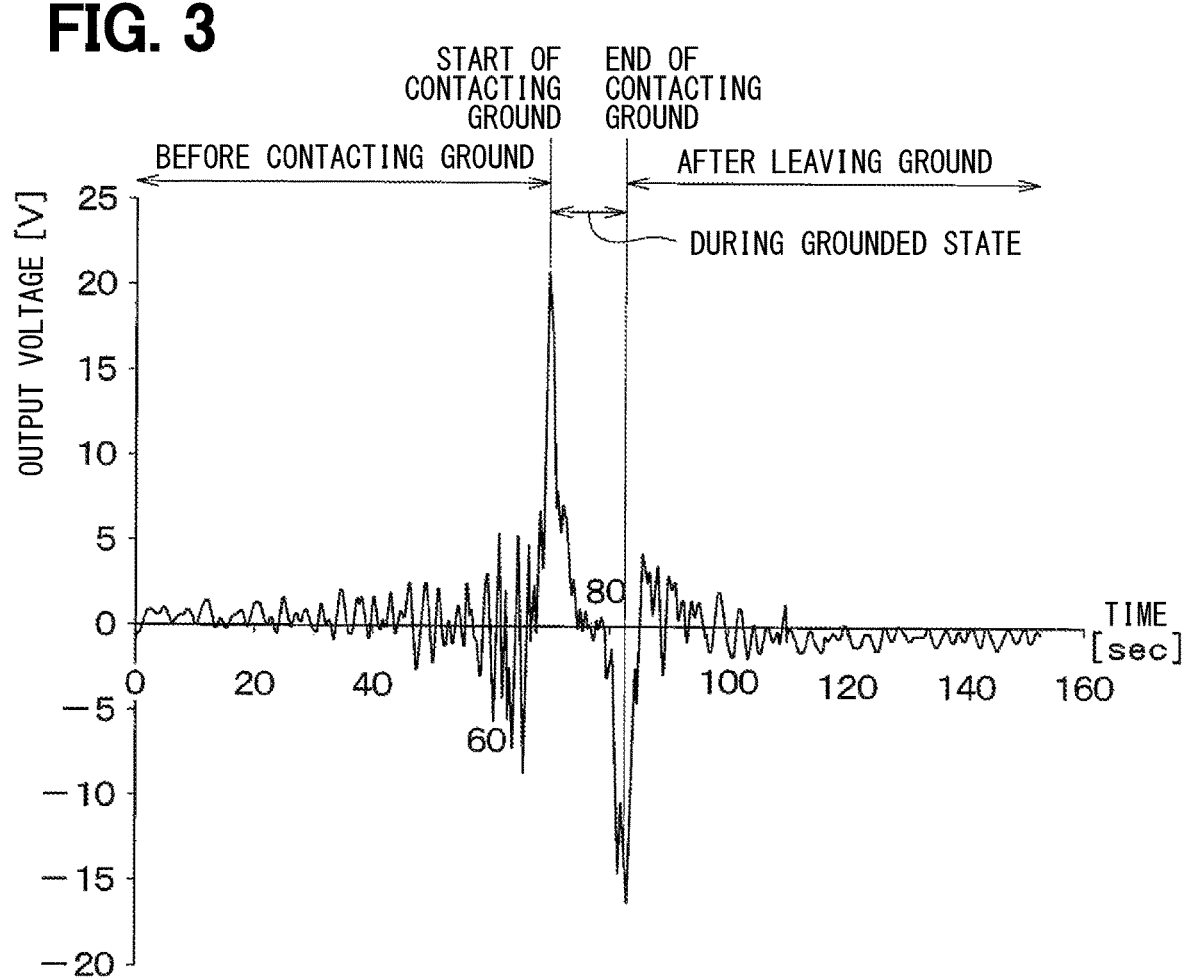
FIG. 3 is an output voltage waveform chart of a vibration sensor unit during rotation of the tire.

An output voltage waveform of the vibration sensor unit 11 when the tire is rotating is, for example, the waveform shown in FIG. 3. As shown in this figure, the output voltage of the vibration sensor unit 11 has a local maximum value when a portion of the tread 31 corresponding to the location of the vibration sensor unit 11 (hereinafter, referred to as a device mounting portion) starts to contact the ground during rotation of the tire 3. The signal processing unit 13 detects a ground contact start time, at which the output voltage of the vibration sensor unit 11 reaches the maximum value, as a first peak value timing. Further, as shown in FIG. 3, the output voltage of the vibration sensor unit 11 takes a minimum value at the end of grounding when the device mounting portion is not grounded from the grounded state. The signal processing unit 13 detects a ground contact end time, at which the output voltage of the vibration sensor unit 11 takes a minimum value as a second peak value timing.

The reason why the vibration sensor unit 11 takes the peak value at the above timing is as follows. When the device mounting portion comes to contact the ground during rotation of the tire 3, the portion of the tire 3 having been in generally cylindrical shape is pressed and deformed in a planar shape near the vibration sensor unit 11. Upon receiving an impact at this time, the output voltage of the vibration sensor unit 11 takes the first peak value. When the device mounting portion leaves the ground surface during rotation of the tire 3, the tire 3 is released from pressurization in a vicinity of the vibration sensor unit 11 and the tire 3 returns from a flat shape to a substantially cylindrical shape. Since the vibration sensor unit 11 receives an impact when the shape of the tire 3 returns to the original shape, the output voltage of the vibration sensor unit 11 takes the second peak value. As described above, the output voltage of the vibration sensor unit 11 takes the first peak value and the second peak value at the start of contacting ground and at the end of contacting the ground, respectively. Since a direction of impact when the tire 3 is pressed and a direction of impact when the tire 3 is released from pressurization are opposite, polarities of the output voltages are also opposite.

The vehicle speed estimation unit 13a calculates a time interval between the first peak values or the time interval between the second peak values from the detection signal of the vibration sensor unit 11, and estimates the vehicle speed from this time interval. Specifically, the time interval between the first peak values or the time interval between the second peak values is a time corresponding to one rotation of the tire 3. Therefore, the vehicle speed estimation unit 13a estimates the vehicle speed from the time interval and the length of one rotation of the tire 3 stored in advance.

Further, the ground contact length calculation unit 13b calculates a ground contact period corresponding to the period from the first peak value to the second peak value by using the detection signal of the vibration sensor unit 11. Then, the ground contact length calculation unit 13b calculates the ground contact length from the vehicle speed estimated by the vehicle speed estimation unit 13a and the ground contact period, and outputs the ground contact length data representing the ground contact length to a data transmission unit 14.

The air pressure calculation unit 13c calculates the tire pressure under the reference temperature based on the detection signal indicating the tire pressure transmitted from the air pressure detection unit 12 and the detection signal indicating the tire inner temperature and transmits the calculated tire pressure to the data transmission unit 14 as the data relating to the tire pressure. The air pressure calculation unit 13c creates data on the tire pressure based on the detection signal of the air pressure detection unit 12 at each predetermined periodic transmission cycle.

Here, the tire pressure under the reference temperature is converted by the air pressure calculation unit 13c. However, the data of the tire pressure and the tire internal temperature indicated by the detection signal of the air pressure detection unit 12 may be transmitted to the data transmission unit 14 as data relating to the tire air without conversion.

The wheel load estimation unit 13d estimates the wheel load applied to the tire 3 based on the tire pressure detected by the pressure sensor 12a and the ground contact length calculated by the ground contact length calculation unit 13b, and transmits the wheel load data representing the estimated wheel load to the data transmission unit 14. The ground contact length becomes longer as the wheel load increases even if the tire pressure is the same. However, even when the tire pressure is low, the contact length becomes long even if the wheel load is not large. Therefore, a correlation between the tire pressure, the contact length, and the wheel load can be investigated in advance, and the wheel load can be estimated from the tire pressure and the contact length based on the correlation.

Figure 4A:
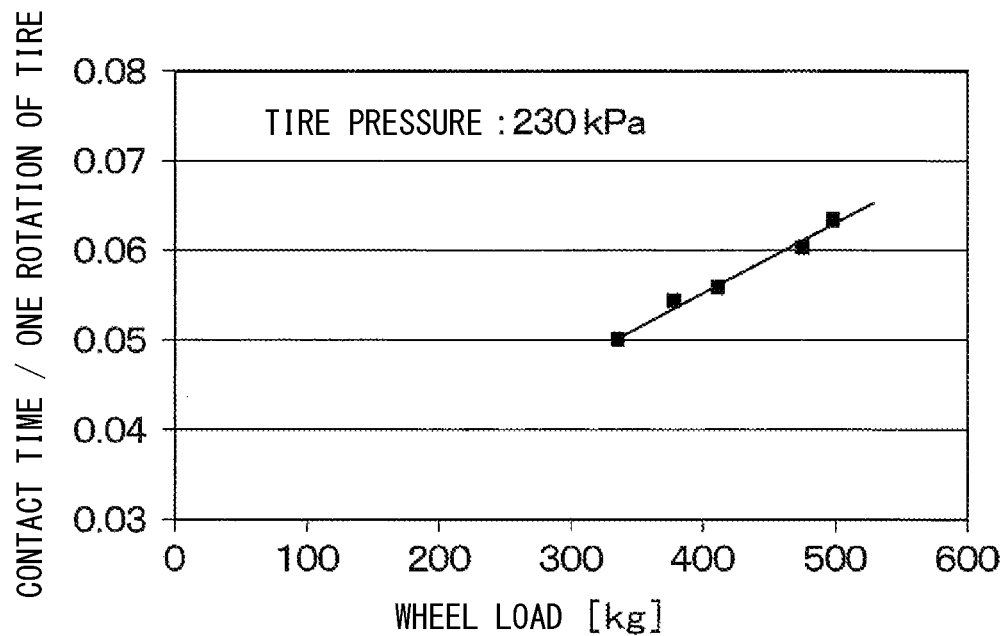
FIG. 4A is a diagram showing a change in a contact length when a wheel load is changed by changing a load weight under a condition that a tire pressure is 230 kPa.
Figure 4B:
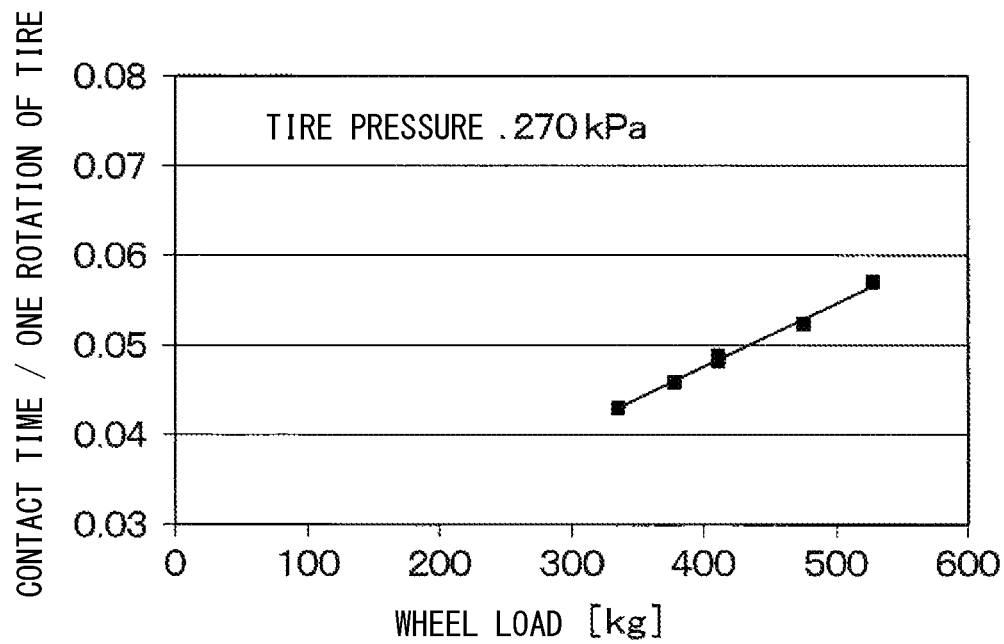
FIG. 4B is a diagram showing a change in the contact length when the wheel load is changed by changing the load weight under a condition that the tire pressure is 270 kPa.

FIGS. 4A and 4B show changes in the contact time during one rotation of the tire when the wheel load is changed by changing the load weight under the condition that the tire pressure is constant at 230 kPa and 270 kPa, respectively. Namely, they show the result of examining the change of the ground contact length. As shown in these figures, when the tire pressure is constant, the larger the wheel load, the longer the contact time, that is, the longer the contact length. The above described relationship is the same even if the tire pressure is different from 230 kPa or 270 kPa. Therefore, the correlation between the contact length and the wheel load can be investigated in advance for each different tire pressure, and this correlation can be stored in a memory such as a ROM of the signal processing unit 13.

Figure 5:
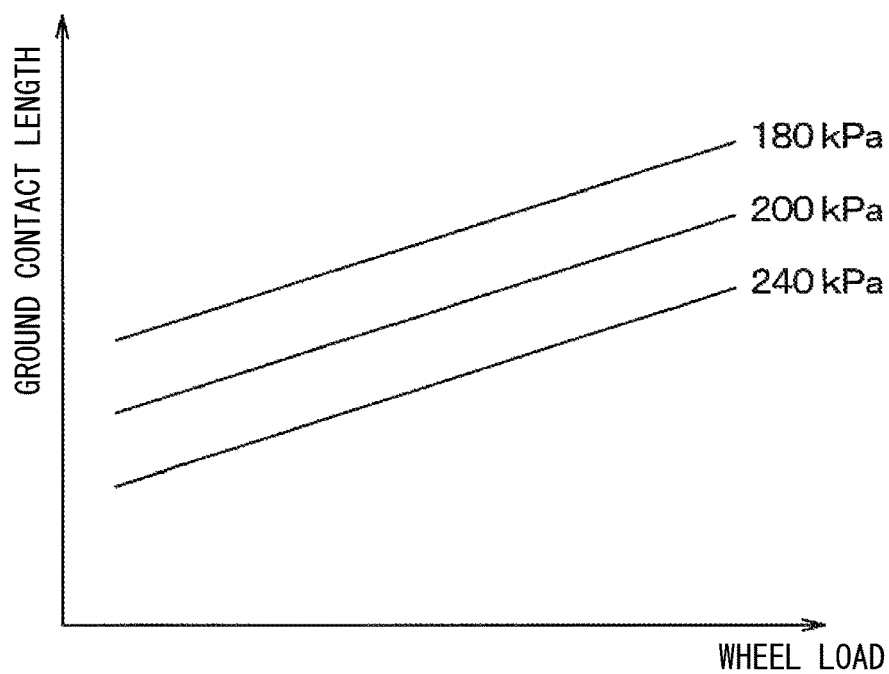
FIG. 5 is a map showing a correlation between the contact length and the wheel load for each different tire pressure.

As the correlation between the contact length and the wheel load for each different tire pressure, for example, a map showing the correlation as shown in FIG. 5 can be used. In this case, from the map shown in FIG. 5, a map corresponding to the tire pressure detected by the pressure sensor 12a is selected, and then a wheel load corresponding to the contact length calculated by the ground contact length calculation unit 13b is obtained. Therefore, the wheel load of the wheel provided with each tire side device 1 can be estimated. The wheel load calculated in this way is an individual wheel load for each wheel. Therefore, even when the wheel load is not constant on all wheels, such as when the load is unevenly loaded on the vehicle, the wheel load estimation unit 13d can estimate the accurate wheel load.

The tire pressure used for estimating the wheel load is the actual tire pressure detected by the pressure sensor 12a. This is because the contact length in the case of the actual tire pressure at that time is a contact length corresponding to the wheel load. A value converted as the tire pressure of the reference temperature can be used, but the actual tire pressure may be used. Therefore, as in the present embodiment, if only the wheel load is estimated and the data related to the tire pressure is acquired, the air pressure calculation unit 13c for calculating the tire pressure at the reference temperature may not be provided.

The signal processing unit 13 controls data transmission from the data transmission unit 14 so that data such as the wheel load data and the tire pressure data to the data transmission unit 14 at a timing at which the data transmission is to be performed. Thereby data transmission is performed from the data transmission unit 14.

For example, the signal processing unit 13 transmits data on tire pressure and wheel load data to the data transmission unit 14 from the air pressure calculation unit 13c and the wheel load estimation unit 13d at predetermined periodic transmission cycles.

The data transmission unit 14 performs data transmission with the vehicle side device 2. The data transmission unit 14 plays a role of being able to transmit at least data such as tire pressure data and wheel load data to the vehicle side device 2. Further, the data transmission unit 14 may be capable of bidirectional transmission with the receiver.

The data transmission unit 14 transmits data at the timing when data on tire pressure or wheel load data is transmitted from, for example, the air pressure calculation unit 13c or the wheel load estimation unit 13d. As described above, the timing of data transmission from the data transmission unit 14 is controlled by the signal processing unit 13, and every time data is transmitted from the air pressure calculation unit 13c and the wheel load estimation unit 13d at predetermined periodic transmission cycles data is transmitted from the data transmission unit 14.

The tire pressure data and the wheel load data are sent to the vehicle side device 2 together with the wheel unique recognition information (hereinafter referred to as ID information) provided in advance for each tire 3 provided in the vehicle. The position of each wheel is capable of being identified by a wheel position detection device that detects where the wheel is attached to the vehicle. With this configuration, it is possible to determine to which wheel the data belongs by sending various data together with the ID information to the vehicle side device 2.

On the other hand, the vehicle side device 2 receives data on tire pressure and wheel load with ID information transmitted from the tire side device 1, and detects the tire pressure of each wheel by performing various processes based on the data. Specifically, the vehicle side device 2 is configured to include a receiving unit 21, an arithmetic processing unit 22, and an alarm display unit 23, determines whether or not the tire pressure of each wheel has decreased, and notifies it, if it is determined that tire pressure is decreasing.

The receiving unit 21 receives the data related to the tire pressure and the data related to the wheel load to which the ID information transmitted by the tire side device 1 is attached. The data related to the tire pressure and the data related to the wheel load to which the ID information received by the receiving unit 21 is attached are sequentially output to the arithmetic processing unit 22 each time the data is received.

The arithmetic processing unit 22 is composed of a computer equipped with a CPU, ROM, RAM, I/O, etc., and functions as a control unit that performs various processing according to a program stored in a memory such as ROM. The arithmetic processing unit 22 is configured to include a threshold value setting part 22a and an alarm determination part 22b as functional parts that perform these processes.

The threshold value setting part 22a sets an alarm threshold value corresponding to the wheel load based on the data regarding the wheel load received by the receiving unit 21. The alarm threshold value here is a value corresponding to the tire pressure at the reference temperature.

Figure 6:
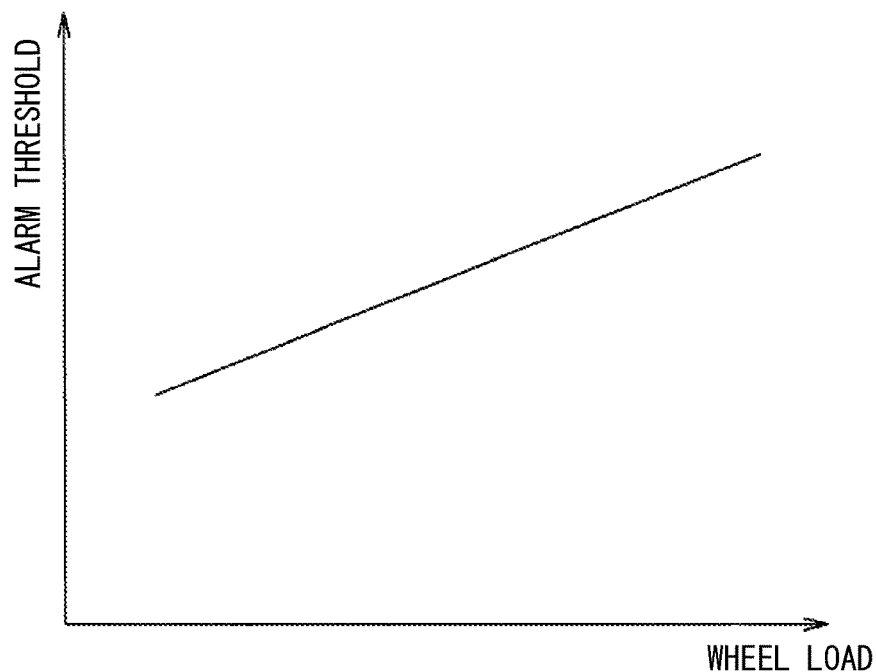
FIG. 6 is a diagram showing a relationship between the wheel load and an alarm threshold value.

As for the tire pressure, the higher the wheel load, the higher the pressure required. Therefore, it is preferable to change an alarm threshold value according to the wheel load, and the higher the wheel load, the higher the alarm threshold value. For example, as shown in FIG. 6, it is possible to make the relationship linearly increase with the alarm threshold value with respect to the increase in the wheel load.

The alarm determination part 22b compares the alarm threshold value of the tire pressure corresponding to the wheel load set by the threshold value setting part 22a with the tire pressure indicated by the data on the tire pressure transmitted from the tire side device 1, and determines whether or not the tire pressure is decreasing. At this time, the tire pressure at the reference temperature is used as the tire pressure indicated by the data on the tire pressure. When the tire pressure and tire internal temperature data indicated by the detection signal of the air pressure detection unit 12 are transmitted as they are as the tire pressure data from the tire side device 1, the tire pressure under the reference temperature is converted from those data. Then, when the tire pressure at the reference temperature drops below the alarm threshold value, the alarm determination part 22b determines that the tire pressure is decreasing. As a result, when the alarm determination part 22b determines that the tire pressure is decreasing, the alarm determination part 22b transmits data indicating that the tire pressure is decreasing to the alarm display unit 23.

The alarm display unit 23 is composed of, for example, a display provided on an instrument panel, and when data indicating that the tire pressure is decreasing is transmitted from the alarm determination part 22b. It displays that the tire pressure is decreasing. This makes it possible for the driver to recognize that the tire pressure has decreased.

At this time, an alarm may be given in a state that specifies which wheel the tire pressure has decreased, by using the ID information for each wheel included in the data sent from the tire side device 1.

As described above, in the TPMS 100 according to the present embodiment, in the tire side device 1, the wheel load is estimated based on the tire pressure and the contact length, and the wheel load data indicating the estimation result of the wheel load is transmitted to the vehicle side device 2. Further, the data is received by the vehicle side device 2 and an alarm threshold value is set based on the wheel load data so that the alarm threshold value corresponding to the wheel load is obtained. This makes it possible to variably set the alarm threshold value for the wheel load, and by comparing the tire pressure with the alarm threshold value corresponding to the wheel load, it is possible to determine the decrease in the tire pressure. Therefore, it is possible to accurately determine the decrease in the tire pressure.

Second Embodiment

A second embodiment will be described. The present embodiment is provided with a threshold value setting part and an alarm determination part in the tire side device 1 with respect to the first embodiment, and the other units/parts are the same as those of the first embodiment. Only the units/parts that differ from the first embodiment will be described.

Figure 7:
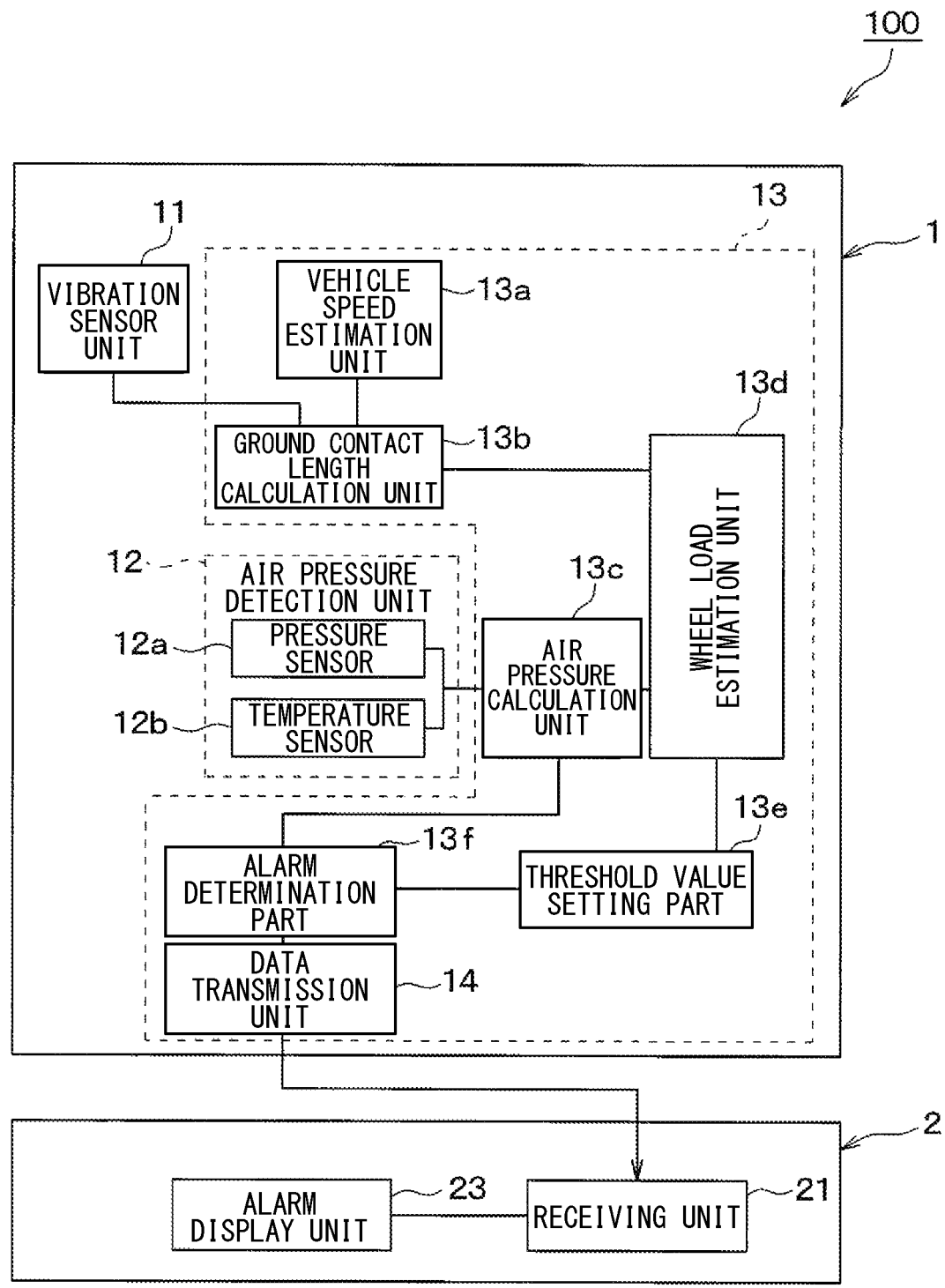
FIG. 7 is a diagram showing an overall block configuration of a TPMS according to a second embodiment.

As shown in FIG. 7, in the TPMS 100 according to the present embodiment, the signal processing unit 13 in the tire side device 1 is provided with a threshold value setting part 13*e* and an alarm determination part 13*f*. The threshold value setting part 13*e* is provided with the function of the threshold value setting part 22*a* described in the first embodiment in the tire side device 1, and sets an alarm threshold value based on an estimation result by the wheel load estimation unit 13*d*. The alarm determination part 13*f* is provided with the function of the alarm determination part 22*b* described in the first embodiment in the tire side device 1, and compares the alarm threshold value set corresponding to the wheel load with the tire pressure calculated by the air pressure calculation unit 13*c*, and determines whether or not the tire pressure has decreased. Then, when the alarm determination part 13*f* determines that the tire pressure has decreased, data indicating that fact is sent to the data transmission unit 14, and the data is transmitted from the data transmission unit 14 to the vehicle side device 2.

On the other hand, the vehicle side device 2 is provided with only the receiving unit 21 and the alarm display unit 23, and when the receiving unit 21 receives data indicating that the tire pressure sent from the data transmission unit 14 has decreased, the data is transmitted to the alarm display unit 23. As a result, the alarm display unit 23 displays that the tire pressure has decreased, and makes the driver recognize that the tire pressure has decreased.

In this way, the tire side device 1 may be provided with a function of setting the alarm threshold value and determining the decrease in tire pressure. In this way, the tire pressure can be detected even when it is not the timing to send the data related to the tire pressure. Therefore, as soon as it is determined that the tire pressure has decreased, it can be immediately transmitted to the vehicle side device 2 and notified to the user via the alarm display unit 23.

Then, if the tire side device 1 is provided with a function for determining the decrease in the tire pressure in this way, for example, by setting a threshold value higher than the alarm threshold value, it is also possible to determine the possibility of the decrease in the tire pressure at an earlier stage. Then, when there is a possibility that the tire pressure is decreasing, if the tire pressure is detected at a cycle shorter than the periodic transmission cycle, it is possible to notify earlier that the tire pressure is decreasing.

Third Embodiment

A third embodiment will be described. In the present embodiment, the alarm threshold value can be set for each type of tire with respect to the first embodiment, and the other parts are the same as those in the first embodiment. Therefore, only the part different from the first embodiment will be described.

Figure 8:
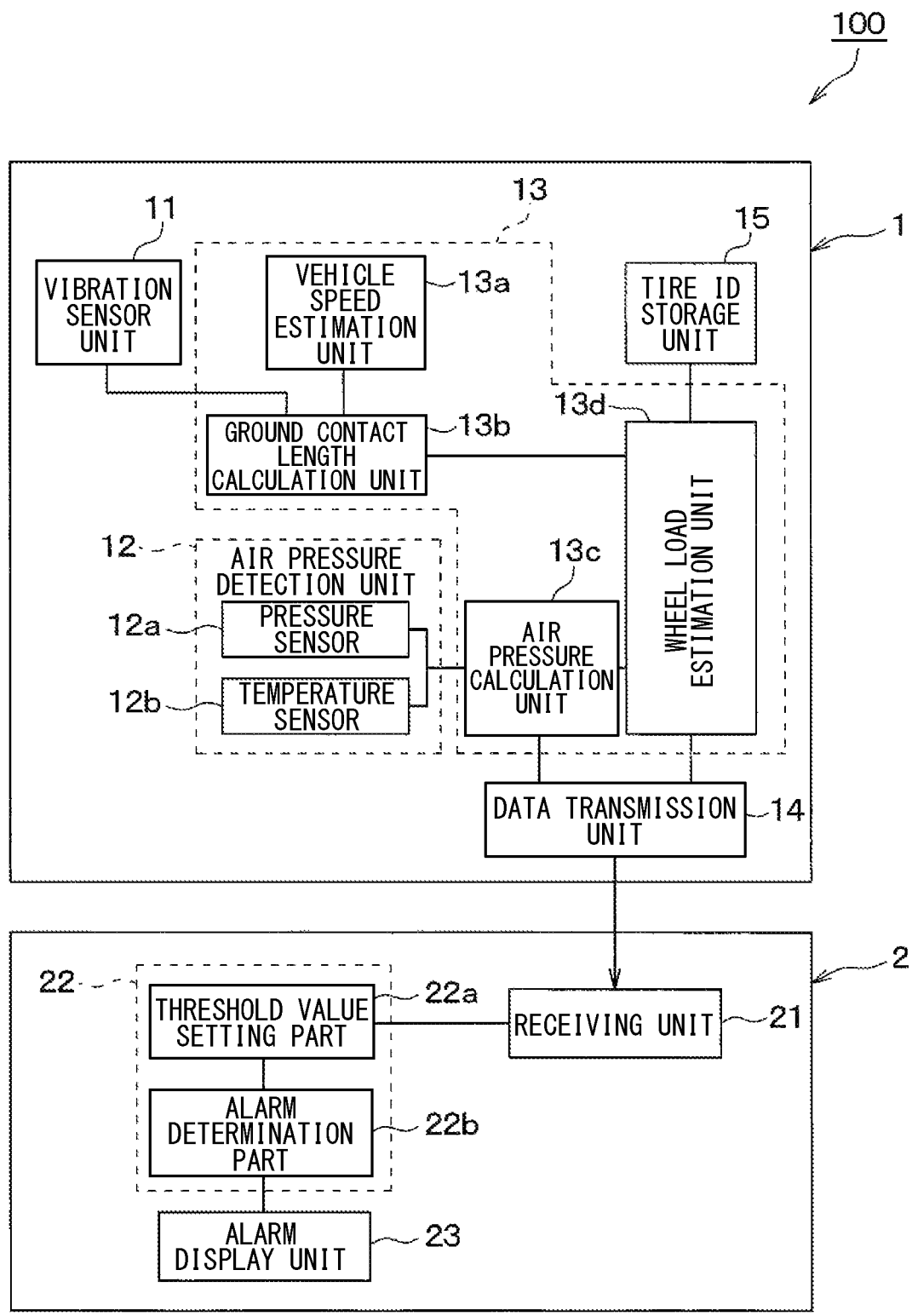
FIG. 8 is a diagram showing an overall block configuration of a TPMS according to a third embodiment.

As shown in FIG. 8, the TPMS 100 of the present embodiment includes an ID storage unit 15 that stores tire identification information (hereinafter referred to as a tire ID) in the tire side device 1. The tire ID is identification information indicating various information related to the tire such as the type of tire.

Figure 9:
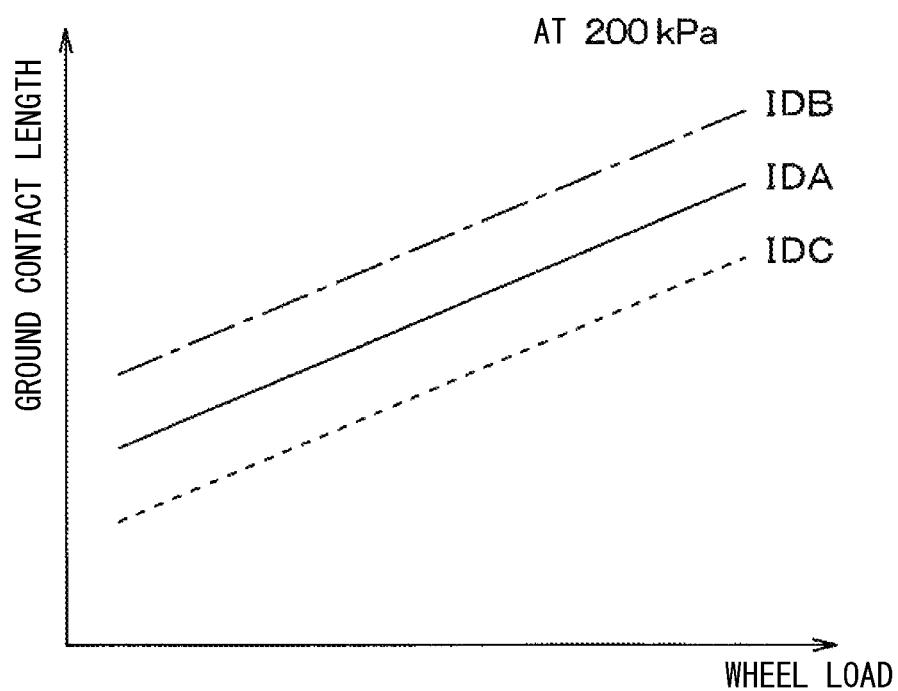
FIG. 9 is a map showing the correlation between the contact length and the wheel load for each tire ID.

Further, the wheel load estimation unit 13*d* stores the correlation between the tire pressure, the contact length, and the wheel load according to the tire ID. For example, as shown in FIG. 9, even if the tire pressure is the same (at 200 kPa), the correlation between the contact length and the wheel load changes for each tire ID. For example, if the radial is referred to as an IDA, in an IDB such as a winter tire having a lower rigidity, there is a correlation between the contact length and the wheel load so that the wheel load becomes a low value, even if the contact length is the same as that of the radial tire. On the contrary, in the same radial tire, if the radial tire with high rigidity is referred to as an IDC, there is a correlation between the contact length and the wheel load so that the wheel load becomes a high value, even if the contact length is the same as that of the IDA radial tire. Therefore, the wheel load estimation unit 13*d* stores a correction coefficient for each tire ID, and corrects the wheel load obtained from the correlation between the tire pressure, the contact length, and the wheel load with the correction coefficient corresponding to the tire ID. Therefore, the wheel load corresponding to the type of the tire 3 can be estimated. For example, if the rigidity of the tire 3 is higher than that of the radial tire, the correction coefficient is larger than 1, and if the rigidity is lower, the correction coefficient is smaller than 1. By multiplying the obtained wheel load by the correction coefficient, the wheel load corresponding to the type of tire 3 can be estimated.

Therefore, the wheel load estimation unit 13*d* reads out the tire ID stored in the ID storage unit 15, and uses the correction coefficient corresponding to the tire ID, and estimates the wheel load corresponding to the type of tire 3 by correcting the wheel load obtained from the correlation between the tire pressure, the contact length, and the wheel load.

In this way, the correction coefficient may be stored for each tire ID, and the wheel load obtained from the correlation between the tire pressure, the contact length, and the wheel load may be corrected. It is possible to accurately set the alarm threshold value corresponding to the type of tire. Therefore, it is possible to accurately determine the decrease in the tire pressure.

Although the correction coefficient is used in the present embodiment, a map or a function formula showing the correlation between the tire pressure, the contact length. The wheel load may be estimated by selecting the correction corresponding to the tire ID stored in the ID storage unit 15. In this configuration as well, the same effect as described above can be obtained.

Other Embodiments

Although the present disclosure has been described in accordance with the above-described embodiments, the present disclosure is not limited to the above-described embodiments, and encompasses various modifications and variations within the scope of equivalents. Furthermore, various combinations and aspects, and other combination and aspect including only one element, more than one element or less than one element, are also within the sprit and scope of the present disclosure.

For example, the tire side device 1 and the vehicle side device 2 may be capable of bidirectional transmission. In this case, it is also possible to acquire the vehicle speed by the vehicle side device 2 and transmit it to the tire side device 1. Specifically, in each of the above embodiments, the tire side device 1 is provided with a vehicle speed estimation unit that estimates the vehicle speed based on the detection signal of the vibration sensor unit 11 as the vehicle speed acquisition unit. On the other hand, when bidirectional transmission is possible, the vehicle speed estimation unit may be provided in the vehicle side device 2 and the vehicle speed estimation result may be transmitted to the tire side device 1. Regarding vehicle speed estimation, for example, the vehicle side device 2 acquires vehicle speed data calculated by an in-vehicle ECU (electronic control unit) based on a detection signal of a vehicle speed sensor through CAN (Controller Area Network) communication, which is an in-vehicle network. Then, the tire side device 1 can acquire the vehicle speed by receiving the vehicle speed estimation result transmitted from the vehicle side device 2. In this case, the portion of the tire side device 1 that acquires the vehicle speed constitutes the vehicle speed acquisition unit.

Further, in the first and third embodiments, the estimation result of the wheel load by the wheel load estimation unit 13*d* is sent to the vehicle side device 2 as the wheel load data. On the other hand, data on the contact length such as the contact time or the contact length itself and the tire pressure detected by the pressure sensor 12*a* are sent to the vehicle side device 2 as wheel load data, and the wheel load may be estimated by the vehicle side device 2 using the sent wheel load data. That is, in each of the above embodiments, the tire side device 1 is provided with the ground contact length calculation unit 13*b* and the wheel load estimation unit 13*d*, but the tire side device 1 may have a function as a data acquisition unit that acquires the wheel load data, which is data related to the wheel load based on the ground contact length.

Further, as the alarm unit, the alarm display unit 23 that gives an alarm by display is given as an example, but the alarm unit is not limited to a visual alarm, and may be an alarm unit that gives an alarm by voice or the like.

The control circuit and method described in the present disclosure may be implemented by a special purpose computer which is configured with a memory and a processor programmed to execute one or more particular functions embodied in computer programs of the memory. Alternatively, the controller and the method described in the present disclosure may be implemented by a special purpose computer configured as a processor with one or more special purpose hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

What is claimed is:

1. A tire pressure monitoring system comprising:
a tire side device provided on a tire side; and
a vehicle side device provided on a vehicle body side on which the tire is mounted, wherein
the tire side device includes
a vibration detection unit configured to output a detection signal corresponding to a magnitude of vibration of the tire,
an air pressure detection unit configured to detect a tire pressure, which is the pressure inside the tire,
a data acquisition unit configured to calculate a contact length of the tire with a road surface based on the detection signal and acquire wheel load data that is data related to a wheel load based on the contact length, and
a data transmission unit configured to transmit data related to the tire pressure and the wheel load data,
the vehicle side device includes
a receiving unit configured to receive the data on the tire pressure and the wheel load data,
a threshold value setting unit configured to set an alarm threshold value for the tire pressure based on the wheel load data,
an alarm determination unit configured to determine that the tire pressure has decreased, when the tire pressure indicated by the data on the tire pressure falls below the alarm threshold value, and
an alarm unit configured to give an alarm when it is determined that the tire pressure has decreased,
the data acquisition unit includes
a ground contact length calculation unit configured to calculate a ground contact length of the tire with the road surface based on the detection signal, and
a wheel load estimation unit configured to estimate the wheel load applied to the tire based on the ground contact length and the tire pressure, and
the wheel load estimation unit stores a correlation between the ground contact length and the wheel load for each different tire pressure, and estimates the wheel load corresponding to the ground contact length based on the correlation corresponding to the tire pressure detected by the air pressure detection unit in the stored correlation.

2. A tire pressure monitoring system, comprising:
a tire side device provided on a tire side; and
a vehicle side device provided on a vehicle body side on which the tire is mounted, wherein
the tire side device includes
a vibration detection unit configured to output a detection signal corresponding to a magnitude of vibration of the tire,
an air pressure detection unit configured to detect a tire pressure, which is the pressure inside the tire,
a data acquisition unit configured to calculate a contact length of the tire with a road surface based on the detection signal and acquire wheel load data that is data related to a wheel load based on the contact length,
a threshold value setting unit configured to set an alarm threshold value for the tire pressure based on the wheel load data,
an alarm determination unit configured to determine that the tire pressure has decreased, when the tire pressure indicated by the data on the tire pressure falls below the alarm threshold value, and
a data transmission unit configured to transmit data indicating that the tire pressure has decreased,
the vehicle side device includes
a receiving unit configured to receive data indicating that the tire pressure has decreased, and
an alarm unit configured to give an alarm when the data indicating that the tire pressure has decreased is received,
the data acquisition unit includes
a ground contact length calculation unit configured to calculate a ground contact length of the tire with the road surface based on the detection signal, and
a wheel load estimation unit configured to estimate the wheel load applied to the tire based on the ground contact length and the tire pressure, and
the wheel load estimation unit stores a correlation between the ground contact length and the wheel load for each different tire pressure, and estimates the wheel load corresponding to the ground contact length based on the correlation corresponding to the tire pressure detected by the air pressure detection unit in the stored correlation.

3. The tire pressure monitoring system according to claim 1, wherein
the tire side device has a vehicle speed acquisition unit configured to acquire the vehicle speed, the vibration detection unit is attached to a back surface of a tread of the tire to output a detection signal according to a magnitude of vibration of the tire, and the ground contact length calculation unit extracts two peaks of the tread during one rotation of the tire at a start of ground contact and at an end of ground contact of a portion corresponding to a location where the vibration detection unit is arranged from the detection signal of the vibration detection unit, and calculates the ground contact length based on a time interval between the two peaks and the vehicle speed.

4. The tire pressure monitoring system according to claim 2, wherein the tire side device has a vehicle speed acquisition unit configured to acquire the vehicle speed, the vibration detection unit is attached to a back surface of a tread of the tire to output a detection signal according to a magnitude of vibration of the tire, and the ground contact length calculation unit extracts two peaks of the tread during one rotation of the tire at a start of ground contact and at an end of ground contact of a portion corresponding to a location where the vibration detection unit is arranged from the detection signal of the vibration detection unit, and calculates the ground contact length based on a time interval between the two peaks and the vehicle speed.

5. The tire pressure monitoring system according to claim 1, wherein the tire side device has an ID storage unit that stores a tire ID that is identification information of the tire, and the wheel load estimation unit stores a correction coefficient for each tire ID, and corrects the wheel load obtained from the correlation by using the correction coefficient corresponding to the tire ID stored in the ID storage unit.

6. The tire pressure monitoring system according to claim 2, wherein the tire side device has an ID storage unit that stores a tire ID that is identification information of the tire, and the wheel load estimation unit stores a correction coefficient for each tire ID, and corrects the wheel load obtained from the correlation by using the correction coefficient corresponding to the tire ID stored in the ID storage unit.

7. A tire pressure monitoring system comprising:
a tire side device provided on a tire side; and
a vehicle side device provided on a vehicle body side on which the tire is mounted, wherein the tire side device includes
    a vibration detector configured to output a detection signal corresponding to a magnitude of vibration of the tire,
    an air pressure detector configured to detect a tire pressure, which is the pressure inside the tire,
    a data acquisitor configured to calculate a contact length of the tire with a road surface based on the detection signal and acquire wheel load data that is data related to a wheel load based on the contact length, and
    a data transmitter configured to transmit data related to the tire pressure and the wheel load data, the vehicle side device includes
    a receiver configured to receive the data on the tire pressure and the wheel load data,
    a threshold value setting adjuster configured to set an alarm threshold value for the tire pressure based on the wheel load data,
    an alarm determinator configured to determine that the tire pressure has decreased, when the tire pressure indicated by the data on the tire pressure falls below the alarm threshold value, and
    an alarm generator configured to give an alarm when it is determined that the tire pressure has decreased, the data acquisitor includes
    a ground contact length calculator configured to calculate a ground contact length of the tire with the road surface based on the detection signal, and
    a wheel load estimator configured to estimate the wheel load applied to the tire based on the ground contact length and the tire pressure, and the wheel load estimator stores a correlation between the ground contact length and the wheel load for each different tire pressure, and estimates the wheel load corresponding to the ground contact length based on the correlation corresponding to the tire pressure detected by the air pressure detector in the stored correlation.

\* \* \* \* \*